US012581535B2

(12) United States Patent
Jacobsen et al.

(10) Patent No.: US 12,581,535 B2
(45) Date of Patent: Mar. 17, 2026

(54) RESOURCE EXCLUSION

(71) Applicant: Nokia Technologies Oy, Espoo (FI)

(72) Inventors: Thomas Haaning Jacobsen, Aalborg (DK); Renato Barbosa Abreu, Aalborg (DK); Nuno Manuel Kiilerich Pratas, Aalborg (DK); Timo Erkki Lunttila, Espoo (FI); Yong Liu, Shanghai (CN); Jakob Lindbjerg Buthler, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/922,647

(22) Filed: Oct. 22, 2024

(65) Prior Publication Data

US 2025/0048427 A1 Feb. 6, 2025

Related U.S. Application Data

(63) Continuation of application No. 18/771,898, filed on Jul. 12, 2024.

(30) Foreign Application Priority Data

Aug. 4, 2023 (WO) ................ PCT/CN2023/111352

(51) Int. Cl.
*H04W 74/0808* (2024.01)
(52) U.S. Cl.
CPC .............................. *H04W 74/0808* (2013.01)
(58) Field of Classification Search
CPC .................................................. H04W 74/0808
See application file for complete search history.

(56) References Cited

U.S. PATENT DOCUMENTS

| | | | |
|---|---|---|---|
| 2020/0252821 A1 | 8/2020 | Deogun et al. | |
| 2021/0352727 A1 | 11/2021 | Babaei | |
| 2023/0054184 A1 | 2/2023 | Loehr et al. | |
| 2023/0063943 A1 | 3/2023 | Ding et al. | |
| 2023/0319878 A1* | 10/2023 | Hui ...................... | H04L 1/1854 370/329 |

(Continued)

FOREIGN PATENT DOCUMENTS

| | | |
|---|---|---|
| WO | 2022212687 A1 | 10/2022 |
| WO | 2023081108 A1 | 5/2023 |

OTHER PUBLICATIONS

Qualcomm. "Summary for WI on NR-based access to unlicensed spectrum" 3GPP TSG RAN Meeting #90e RP-202753, Dec. 11, 2020 (Dec. 11, 2020), the whole document.

(Continued)

*Primary Examiner* — Kevin M Cunningham
(74) *Attorney, Agent, or Firm* — Carter, DeLuca & Farrell LLP

(57) ABSTRACT

Example embodiments of the present disclosure relate to a method, apparatus, and computer readable storage medium for resource exclusion. In a method, an apparatus determines at least one resource block (RB) set where a consistent listen before talking (LBT) failure is detected for the at least one RB set. Then, the apparatus determines the number of available candidate resources within a time window where the available candidate resources exclude candidate resources on the at least one RB set within the time window.

15 Claims, 2 Drawing Sheets

200

DETERMINE AT LEAST ONE RB SET, A CONSISTENT LBT FAILURE BEING DETECTED FOR THE AT LEAST ONE RB SET — 210

DETERMINE THE NUMBER OF AVAILABLE CANDIDATE RESOURCES WITHIN A TIME WINDOW, THE AVAILABLE CANDIDATE RESOURCES EXCLUDING CANDIDATE RESOURCES ON THE AT LEAST ONE RB SET WITHIN THE TIME WINDOW — 220

DETERMINE, FROM THE CANDIDATE RESOURCES ON THE AT LEAST ONE RB SET, A FIRST CANDIDATE RESOURCE AS AN AVAILABLE CANDIDATE RESOURCE WITHIN THE TIME WINDOW — 230

(56) References Cited

U.S. PATENT DOCUMENTS

2024/0049286 A1 * 2/2024 Jeong ............... H04W 74/0816
2024/0298350 A1 * 9/2024 Alfarhan ........... H04W 74/0808

OTHER PUBLICATIONS

International Search Report issued by the China National Intellectual Property Administration acting as the International Searching Authority in relation to International Application No. PCT/CN2023/111352 dated Apr. 23, 2024 (3 pages).
Written Opinion of the International Searching Authority issued by the China National Intellectual Property Administration acting as the International Searching Authority in relation to International Application No. PCT/CN2023/111352 dated Apr. 23, 2024 (4 pages).
Search Report for Taiwan Application No. 113127490 dated Mar. 27, 2025, 3 pages total.
Internet document. Sharp. Discussion on LS on SL LBT failure indication and consistent SL LBT failure. 3GPP TSG RAN WG1 Meeting #112 R1-2301565. Feb. 27-Mar. 3, 2023. https://www.3gpp.org/ftp/tsg_ran/WG1_RL1/TSGR1_112/Docs/R1-2301565.zip Section 2.2.
"WID revision: NR sidelink evolution", 3GPP TSG RAN Meeting #99, RP--230077, Agenda: 9.3.1.5, Oppo, Mar. 20-23, 2023, 6 pages.
"5 GHz RLAN; Harmonised Standard covering the essential requirements of article 3.2 of Directive 2014/53/EU", ETSI EN 301 893, V2.1.1, May 2017, pp. 1-122.
"IEEE 802.11", Wikipedia, Retrieved on Jul. 22, 2024, Webpage available at : https://en.wikipedia.org/wiki/ IEEE_802.11.
"3rd Generation Partnership Project: Technical Specification Group Radio Access Network; Physical layer procedures for shared spectrum channel access (Release 17)", 3GPP TS 37.213, V17 6.0, Jun. 2023, pp. 1-39.
"3rd Generation Partnership Project: Technical Specification Group Radio Access Network; NR; Physical layer procedures for data (Release 17)", 3GPP TS 38.214, V17.6.0, Jun. 2023, pp. 1-231.

* cited by examiner

RESOURCE EXCLUSION

FIELDS

Various example embodiments of the present disclosure generally relate to the field of telecommunication and in particular, to a method, apparatus and computer readable storage medium for resource exclusion.

BACKGROUND

For New Radio (NR) sidelink evolution in Release 18 (Rel-18), sidelink in unlicensed spectrum (SL-U) is supported. In sub-7 GHz unlicensed bands, coexistence of a NR system with other systems, such as Electrical and Electronics Engineers (IEEE) 802.11 systems, is ensured via a Listen Before Talking (LBT) channel access mechanism. With this mechanism, a user equipment (UE) intending to perform a sidelink (SL) transmission needs first to successfully complete an LBT check, before being able to initiate that transmission. LBT can also be referred as Clear Channel Assessment (CCA) or a channel access procedure. A UE may attempt to transmit multiple times, but LBT for transmitting on associated RB set(s) may consistently fail, for example, if the channel is very busy. Such consistent failures may be called a consistent LBT (C-LBT or CLBT) failure.

SUMMARY

In a first aspect of the present disclosure, there is provided an apparatus. The apparatus comprises at least one processor; and at least one memory storing instructions that, when executed by the at least one processor, cause the apparatus at least to: determine at least one resource block (RB) set, a consistent listen before talking (LBT) failure being detected for the at least one RB set; and determine the number of available candidate resources within a time window, the available candidate resources excluding candidate resources on the at least one RB set within the time window.

In a second aspect of the present disclosure, there is provided a method. The method comprises: determining at least one resource block (RB) set, a consistent listen before talking (LBT) failure being detected for the at least one RB set; and determining the number of available candidate resources within a time window, the available candidate resources excluding candidate resources on the at least one RB set within the time window.

In a third aspect of the present disclosure, there is provided an apparatus. The apparatus comprises means for determining at least one resource block (RB) set, a consistent listen before talking (LBT) failure being detected for the at least one RB set; and means for determining the number of available candidate resources within a time window, the available candidate resources excluding candidate resources on the at least one RB set within the time window.

In a fourth aspect of the present disclosure, there is provided a computer readable medium. The computer readable medium comprises instructions stored thereon for causing an apparatus to perform at least the method according to the second aspect.

It is to be understood that the Summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
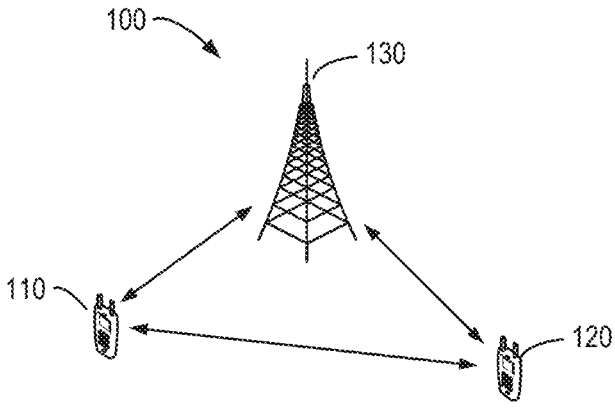
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first," "second" and the like may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used herein, unless stated explicitly, performing a step "in response to A" does not indicate that the step is performed immediately after "A" occurs and one or more intervening steps may be included.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G), the sixth generation (6G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), an NR NB (also referred to as a gNB), a Remote Radio Unit (RRU), a radio header (RH), a remote radio head (RRH), a relay, an Integrated Access and Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. In some example embodiments, radio access network (RAN) split architecture comprises a Centralized Unit (CU) and a Distributed Unit (DU) at an IAB donor node. An IAB node comprises a Mobile Terminal (IAB-MT) part that behaves like a UE toward the parent node, and a DU part of an IAB node behaves like a base station toward the next-hop IAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, various mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to a Mobile Termination (MT) part of an IAB node (e.g., a relay node). In the following description, the terms "terminal device", "communication device", "terminal", "user equipment" and "UE" may be used interchangeably.

As used herein, the term "resource," "transmission resource," "resource block," "physical resource block" (PRB), "uplink resource," or "downlink resource" may refer to any resource for performing a communication, for example, a communication between a terminal device and a network device, such as a resource in time domain, a resource in frequency domain, a resource in space domain, a resource in code domain, or any other resource enabling a communication, and the like. In the following, unless explicitly stated, a resource in both frequency domain and time domain will be used as an example of a transmission resource for describing some example embodiments of the present disclosure. It is noted that example embodiments of the present disclosure are equally applicable to other resources in other domains.

As described above, in sub-7 GHz unlicensed bands, coexistence of a NR system with other systems (e.g., IEEE 802.11 systems) is ensured via a LBT channel access mechanism. With this mechanism, if a UE passes an LBT check, it observes the channel as available for a number of consecutive CCA slots. In sub-7 GHz, the duration of these slots is 9 μs. The UE deems the channel as available in a CCA slot if the measured power (i.e., the collected energy during the CCA slot) is below a regulatory specified energy detection threshold (EDT), which may depend on a transmit power, an operating band and a geographical region.

When a UE initiates a communication (i.e., the UE takes the role of an initiating device), this UE needs to acquire the "right" to access the channel for a certain period of time—denoted in the regulations as channel occupancy time (COT). The COT may be acquired by applying an "extended" LBT procedure which is commonly known as LBT Type 1 as specified in the 3rd Generation Partnership Project (3GPP) standards such as 3GPP TS 37.213. The "extended" LBT procedure may be performed in a contention window (CW), and the channel is deemed as free for the entire duration of the CW.

The duration of both the COT and CW depends on the Channel Access Priority Class (CAPC) associated with the traffic of the UE. Table 1 as below shows CAPC for uplink (UL), e.g., according to Table 4.2.1-1, 3GPP TS 37.213.

acquired COT (in case the gap between two SL transmissions is ≥25 μs, as well for SL transmissions following another SL transmission from another device such as a responding device); Type 2B (16 μs LBT)—for SL transmissions within the initiating device acquired COT (which can also be used for SL transmissions following another SL with gap equal to 16 μs); Type 2C (no LBT)—which can be used for SL transmissions within the initiating device acquired COT and for SL transmission following another SL transmission from another device such as a responding device, with a gap ≤16 us and the allowed duration of the SL transmission ≤584 μs.

The initiating device can share its acquired COT with its intended receiver (e.g., the responding device). For this purpose, the initiating device may inform (e.g., via control signaling) the responding device about the duration of this COT. The responding device then uses this information to decide which type of LBT it is to apply upon performing a

TABLE 1

| Channel Access Priority Class (p) | $m_p$ | $CW_{min, p}$ | $CW_{max, p}$ | $T_{ulmcot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE1:

For p = 3, 4, $T_{ulmcot,p}$ = 10 ms if the higher layer parameter absenceOfAnyOtherTechnology-r14 or absenceOfAnyOtherTechnology-r16 is provided, otherwise, $T_{ulmcot,p}$ = 6 ms.

NOTE 2:

When $T_{ulmcot,p}$ = 6 ms it may be increased to 8 ms by inserting one or more gaps. Theminimum duration of a gap shall be 100 us. The maximum duration before including any such gap shall be 6 ms.

As an example, control plane traffic such as Physical Sidelink Control Channel (PSCCH) traffic may be transmitted with p=1, while user plane traffic may have p>1 where p represents CAPC. As shown in Table 1, the length of the contention window in CCA slots associated with each CAPC has a minimum ($CW_{min,p}$) and a maximum ($CW_{max,p}$). The duration of the COT is given by $T_{ulm\ cot,p}$. It is to be noted that although the LBT Type 1 details for the Uu UL case is shown in Table 1, the LBT Type 1 parameters for the downlink (DL) case could also in principle be adopted in SL.

During a countdown procedure of the contention window, if the LBT check fails in any CCA slot, then the countdown of the contention window will stop and will only resume if the channel is deemed as free (i.e., the LBT check is successful) during a defer time. The countdown procedure of the contention window may be disrupted if the following conditions are met: (a) neither the defer time nor the countdown are disrupted (i.e., the channel is not detected as busy during a sensing slot); (b) the defer time is disrupted (i.e., the channel is detected as busy during a sensing slot of the defer time); and (c) the countdown of the contention window is disrupted (i.e., the channel is detected as busy during a sensing slot of the countdown).

Upon successfully completing LBT Type 1 and performing a transmission, the UE initiating the transmission (e.g., the initiating device) acquires the COT with duration associated with the corresponding CAPC. The acquired COT is valid even in the case where the initiating device pauses its transmission. In this case, if the initiating device wants to perform a new transmission (within the COT), it is still required to perform a "reduced" LBT procedure which is commonly known as LBT Type 2, for example, as specified in 3GPP TS 37.213.

LBT Type 2 has the following variants: Type 2A (25 μs LBT)—for SL transmissions within the initiating device transmission for which the intended receiver is the initiating device. In case the responding device transmission falls outside the COT, then the responding device will acquire a new COT using LBT Type 1 with the appropriate CAPC.

In NR in unlicensed spectrum (NR-U), a multi-channel access procedure was supported to allow a wider transmission bandwidth and improve a data rate, also known as transmissions in multiple resource block (RB) sets, where each RB set contain the RBs corresponding to a channel for which the UE may need to perform LBT for transmitting. In NR-U, the multi-channel access procedure comprises Type A and Type B procedures for dynamic channel access. In the Type A procedure, the gNB performs a backoff procedure on each channel in parallel. When the backoff counter on a given channel reaches zero, the gNB starts a transmission on the channel. The transmissions may start on multiple channels if the corresponding backoff counters reach zero simultaneously. In the Type B procedure, the gNB selects a single primary channel on which it performs a backoff procedure. When the backoff procedure completes, the gNB starts transmissions on the primary channel and on the other channels that have been sensed idle for a period of time before the backoff finishes. The SL-U operation using one or multiple RB sets is being considered and multi-channel access procedure is being discussed.

It is agreed to support a SL-specific consistent LBT (C-LBT) failure detection and recovery procedure in a Medium Access Control (MAC) layer (also called a MAC entity) for SL-U. A UE may attempt to transmit multiple times, but LBT for transmitting on associated RB set(s) may consistently fail, for example, if the channel is very busy. Such consistent failures may be called a C-LBT failure. In Rel-18 SL-U, it has been agreed that a physical (PHY) layer (i.e., L1) (also called a PHY entity or an L1 entity) measures and reports LBT failures to the MAC layer. After a (pre) configured set of detected LBT failures, the MAC layer declares a consistent LBT failure on the given RB set and indicates this to the PHY layer i.e., upon resource selection. SL LBT failure indication granularity may be per SL RB set. If the MAC entity informs the L1 entity of the RB set information where SL C-LBT failure was detected, the L1 entity performs the resource exclusion for the RB set that SL C-LBT failure was detected.

It is left to be considered how the PHY layer will do this exclusion in the resource (re-)selection procedure. If exclusion behavior in the PHY layer is done in the step (or operation) of exclusion of candidate resources in non-monitored slots (e.g., Step 5 in Section 8.1.4, 3GPP TS 38.214), all candidate resources will be reinitialized if too many resources are excluded (e.g., Step 5a in Section 8.1.4, 3GPP TS 38.214), which means that the rules for exclusion of candidate resources in non-monitored slots may be useless (if always circumvented by the (re) initialization operation in Step 5a). Step 5 and Step 5a in Section 8.1.4, 3GPP TS 38.214 are described as below.

---

5) The UE shall exclude any candidate single-slot resource $R_{x,y}$ from the set $S_A$ if it meets all the following conditions:
- the UE has not monitored slot $t'^{SL}_m$ in Step 2.
- for any periodicity value allowed by the higher layer parameter sl-ResourceReservePeriodList and a hypothetical SCI format 1-A received in slot $t'^{SL}_m$ with 'Resource reservation period' field set to that periodicity value and indicating all subchannels of the resource pool in this slot, condition c in step 6 would be met.
5a) If the number of candidate single-slot resources $R_{x,y}$ remaining in the set $S_A$ is smaller than $X \cdot M_{total}$, the set $S_A$ is initialized to the set of all the candidate single-slot resources as in step 4.

---

In addition, in the step of the exclusion of candidate resources in non-monitored slots (e.g., Step 5), $M_{total}$ is not updated, which represents the total quantity of candidate resources available in a selection window for candidate resources. $M_{total}$ (or a weighted version of $M_{total}$) is used to determine whether or not to increase a resource exclusion threshold e.g., a Reference Signal Received Power (RSRP) threshold. If candidate resources from RB sets, which are detected or marked as suffering from consistent LBT failures, are still considered as part of the initial feasible set, the PHY layer would mistakenly believe that it is feasible to gather more resources (including the ones in the RB sets indicated to have a consistent LBT failure) by increasing the RSRP threshold. There is a need that a candidate resource from RB sets suffering from consistent LBT failures is not considered as an available candidate, but a candidate that is not part of an initial feasible set.

Example embodiments of the present disclosure propose a resource exclusion scheme. With this scheme, the number of available candidate resources within a time window (such as a selection window for candidate resources) is determined by excluding candidate resources on at least one RB set for which a C-LBT failure is detected within the time window. In the context of the present disclosure, an RB set where a C-LBT failure is detected will also be referred to as an RB set suffering from or with a C-LBT failure. Further, the initial feasible set and the resource exclusion threshold may be determined based on the number of available candidate resources excluding the candidate resources on the at least one RB set suffering from the C-LBT failure. In this way, the LBT procedure may be more effective and efficient.

FIG. 1 illustrates an example communication environment 100 in which example embodiments of the present disclosure can be implemented.

The communication environment 100, which may be a part of a communication network, comprises a first terminal device 110, a second terminal device 120 and a network device 130 which can communicate with each other. A link from the network device 130 to the terminal device 110 or 120 is referred to as a downlink (DL), while a link from the terminal device 110 or 120 to the network device 130 is referred to as an uplink (UL). In DL, the network device 130 is a transmitting (TX) device (or a transmitter), and the terminal device 110 or 120 is a receiving (RX) device (or a receiver). In UL, the terminal device 110 or 120 is a TX device (or a transmitter), and the network device 130 is a RX device (or a receiver). In addition, a link between two terminal devices 110 and 120 is referred to as a sidelink (SL). In SL, one of the terminal devices 110 and 120 is a TX device (or a transmitter) or an initiating device, and the other of the terminal devices 110 and 120 is a RX device (or a receiver) or a responding device.

Communications in the communication environment 100 may be implemented according to any proper communication protocol(s), comprising, but not limited to, cellular communication protocols of the first generation (1G), the second generation (2G), the third generation (3G), the fourth generation (4G), the fifth generation (5G), the sixth generation (6G), and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

It is to be understood that the number of devices is shown in FIG. 1 only for the purpose of illustration without suggesting any limitation. The communication environment 100 may include any suitable number of terminal devices and network devices configured to implement example embodiments of the present disclosure.

In some example embodiments, the first terminal device 110 and the second terminal device 120 may communicate in SL-U. For example, in the embodiments where the first terminal device 110 operates as an initiating device and the second device 120 operates as a responding device, the first terminal device 110 (e.g., at the PHY layer) may perform an LBT detection before transmission. If the PHY layer detects a LBT failure, the PHY layer may report this failure to a MAC layer of the first terminal device 110. The PHY layer may indicate to the MAC layer which RB sets suffered a LBT failure, and therefore the MAC layer can track which RB set(s) is suffering from a consistent LBT failure. The MAC layer may report to the PHY layer the RB set(s) to be excluded due to the RB set(s) suffering from a consistent LBT failure. Then, the PHY layer may exclude the candidate resources from RB sets marked as suffering from the consistent LBT failure.

In the following, as an example, some example embodiments will be described with reference to interactions between the PHY layer and the MAC layer (or other higher layers) at an apparatus. It is to be understood that the example embodiments herein can be applied in general by the apparatus as a whole. Herein, a higher layer and an MAC layer may be used interchangeably, and L1, a physical layer and a lower layer may also be used interchangeably.

In various embodiments, candidate resources in RB sets that are excluded, do not count in the total number of available candidate resources (e.g., $M_{total}$). In other words, the total number of candidate resources becomes equal to all the available candidate resources in the selection window for candidate resources after excluding all resources in the selection window that belong to the RB sets where consistent LBT failure has been declared. Some example implementations will be discussed below with reference to FIG. 2.

Figure 2:
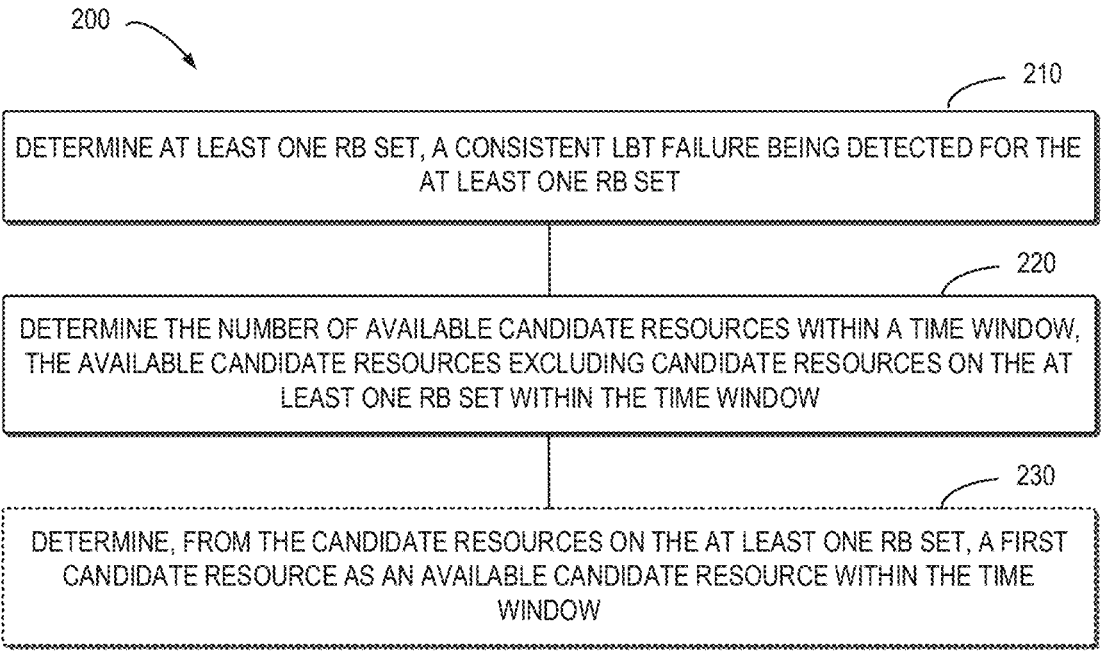
FIG. 2 illustrates a flow chart of an example method of resource exclusion in accordance with some example embodiments of the present disclosure.

FIG. 2 illustrates a flow chart of an example method 200 of resource exclusion in accordance with some example embodiments of the present disclosure. The method 200 can be implemented at an apparatus which may be the first terminal device 110, the second terminal device 120 or the network device 130 as shown in FIG. 1.

As shown in FIG. 2, at block 210, the apparatus determines at least one RB set where a C-LBT failure is detected for the at least one RB set. In an example, if the LBT procedures for the at least one RB set is consistently failed for some times, the at least one RB set may be determined as suffering from a C-LBT failure. The determination of at least one RB set suffering from a C-LBT failure may be implemented by the PHY layer of the apparatus based on LBT checks or based on a declaration or report from a higher layer such as a MAC layer.

In an example, in the example embodiments where the PHY layer obtains from the higher layer the indication that certain RB sets are suffering from consistent LBT failures, a parameter may be introduced to let the PHY layer know which RB sets suffer from consistent LBT failures. That could be done, for example, each time higher the layer triggers L1 resource selection for one transport block (TB) with a set of parameters which may include the parameter (e.g., ConsistentLBTFailureRBSets) to indicate the exclusion of RB sets suffering from consistent LBT failures.

Taking the specification as in Section 8.1.4, 3GPP TS 38.214 as an example, the parameter ConsistentLBTFailureRBSets may be defined as below.

---

...

In resource allocation mode 2, the higher layer can request the UE to determine a subset of resources from which the higher layer will select resources for PSSCH/PSCCH transmission. To trigger this procedure, in slot n, the higher layer provides the following parameters for this PSSCH/PSCCH transmission:

...

- Optionally, indication of RB-Set(s) which should be excluded due to consistent LBT failure as ConsistentLBTFailureRBSets.

...

---

With such a parameter, the PHY layer may be informed of the RB set(s) to be excluded due to C-LBT failures.

At block 220, the apparatus determines the number of available candidate resources within a time window (such as the selection window) where the available candidate resources exclude candidate resources on the at least one RB set within the time window. By excluding candidate resources on the at least one RB set suffering from the C-LBT failure from the counting of the total number of available candidate resources, the LBT procedure may be implemented by the apparatus in a more effective and efficient way.

In some example embodiments, an RB set can be declared to be experiencing from consistent LBT failure for a limited period of time, which can have lower duration than the selection window. In this case, the candidate resources on the at least one RB set in a time period (e.g., one or more slots) within the time window may be excluded from the available candidate resources within the time window. Thus, the resources in the RB set of a specific slot are only excluded if the RB set is detected or marked to be experiencing from consistent LBT failure at that SL slot.

To exclude the candidate resources on the at least one RB set with the C-LBT failure from the total number of available candidate resources, these candidate resources may be determined to be unavailable within the time window. Alternatively, or in addition, these candidate resources may be excluded from a set of available candidate resources within the time window.

Taking the specification as in Section 8.1.4, 3GPP TS 38.214 as an example, the following implementations may be used to exclude candidate resources from the RBs with the C-LBT failure. One implementation is to do not include candidates from RB sets indicated to suffer from the consistent LBT failure in $M_{total}$ (denoting the total number of available candidate resources) in Step 1. As such, candidate resources from RB sets suffering from the consistent LBT failure may be determined to be unavailable at the beginning.

---

...

1) A candidate single-slot resource for transmission $R_{x,y}$ is defined as a set of $L_{subCH}$ contiguous sub-channels ...

...

The total number of candidate single-slot resources is denoted by $M_{total}$.
- Candidate resources in an RB set which is detected to be suffering from consistent LBT failures are not considered as a candidate resource.

...

---

Another implementation is to initialize $S_A$ (denoting a set of available candidate resources) with candidate single-slot resources, excluding the candidate resources that are in RB sets which are indicated to have consistent LBT failures. Thus, the candidate resources from RB sets suffering from the C-LBT failure may be excluded from the initialized set of available candidate resources.

---

...

4) The set $S_A$ is initialized to the set of all the candidate single-slot resources. Candidate single-slot resources in RB sets indicated for consistent LBT failure are not included in the set $S_A$.

...

---

In yet another implementation, the exclusion of candidate resources in RB sets that are marked as suffering from consistent LBT failures are done in the framework of Step 5 as discussed above. For example, in Step 5, it may be defined that candidate resources that are in RB sets that are indicated to have consistent LBT failures are excluded. It is to be understood that the various implementations to exclude the candidate resources in RB sets with the consistent LBT failure may be performed separately or in a combination depending on the network deployment and implementations.

In some example embodiments, in order to exclude the candidate resources on the at least one RB set suffering from the C-LBT failure, a threshold strength for excluding the candidate resources on that RB set from the available candidate resources may be set to be lower than a reference threshold strength. In an example, the reference threshold strength may be a resource exclusion threshold (e.g., based on an RSRP, also called an RSRP threshold) used for excluding a candidate from the available candidate resources. In this way, even if the candidate resources on the at least one RB set suffering from the C-LBT failure has lower RSRPs, these candidate resources will still be excluded from the available candidate resources.

In an example, the threshold strength for excluding the candidate resources belonging to RB sets where the consistent LBT failure has been declared may have an offset with respect to the reference threshold strength. As such, all resources belonging to the RB sets suffering from the consistent LBT failure may have their measured RSRP increased by a RSRP offset. In this way, the candidate resources from RB sets with the consistent LBT failure are excluded if their associated RSRP measurement added by an offset are higher than a RSRP threshold.

This is to be understood that the threshold strength based on an RSRP is only an example but not a limitation. In some example embodiments, the threshold strength may be based on other types of measured strength or power that can used to assess whether the channel is idle or not. The measured strength may include reference signal receiving quality (RSRQ), signal to interference plus noise ratio (SINR) and/or the like.

In some example embodiments, the offset of the threshold strength for excluding the candidate resources belonging to RB sets with the consistent LBT failure with respect to the reference threshold strength may be (pre) configured by the higher layer or a network or defined in the 3GPP standards. In an example, the offset may be set be the same for all RB sets where consistent LBT failure has been declared.

In another example, an offset of a threshold strength for excluding a candidate resource (referred to as a second candidate resource for the purpose of discussion) from the at least one RB set suffering from the C-LBT failure may be related to a channel busy ratio (CBR) associated with the second candidate resource, e.g., associated with an RB set to which the second candidate resource belongs. For example, the offset may be proportional to the CBR measured in an RB set to which the second candidate resource belongs. That is, the higher is the CBR, the higher will the offset be. In this way, an RB set with a higher CBR may be excluded in a higher priority, to further improve the efficiency of the LBT procedure.

In some example embodiments, in order to handle the case where too many resources have been excluded due to RB sets marked to suffer from LBT failure, as shown in FIG. 2, at block 230, the apparatus may determine a candidate resource (referred to as a first candidate resource for the purpose of discussion) from the candidate resources on the at least one RB set as an available candidate resource within the time window. For example, RB sets that are marked as suffering from consistent LBT failure may be reinitialized despite being marked. This reintroduction or reinitialization of the RB sets suffering from the consistent from LBT failure may be triggered based on at least one condition (referred to as a first condition) being met.

In some example embodiments, the at least one first condition may comprise a condition that the number of available candidate resources is equal to or smaller than a threshold number, which means that there are not enough resources to use. If this condition is met or satisfied, a candidate resource from the RB set suffering from the C-LBT may be reintroduced in the available candidate resources. For example, if the number of identified candidate resources (e.g., $M_{total}$) is below a configured threshold, then the PHY layer may reintroduce candidate resources from RB sets which are marked to suffer from the consistent LBT failure.

Alternatively, or in addition, the at least one first condition may comprise a condition that a reference threshold strength (or a resource exclusion threshold) for excluding a candidate from the available candidate resources is equal to or higher than a threshold strength. For example, if the number of candidate resources in the selection window is smaller, for example, less than x % of the total number $M_{total}$ where x={20, 35, 50}, the reference threshold strength (e.g., a RSRP threshold) may be increased by 3 dB. Such increasement may be repeated to get more available candidate resources. If the reference threshold strength has been increased above a certain level, for example, equal to or greater than a predetermined threshold strength or more than X times (where X represents any positive integer), candidate resources from RB sets suffering from the consistent LBT failure may be reintroduced in the available candidate resources. As an example, resources belonging to an RB set where consistent LBT failure has been declared can be included in the available candidate resource set only when the iterative procedure to increase the RSRP threshold has occurred more than a configured number of times.

The first conditions as descried above may be considered or used separately or in combination which may depend on the network and terminal implementations. Still taking the specification as in Section 8.1.4, 3GPP TS 38.214 as an example, if the resource exclusion threshold has increased above a certain level (or increased more than X times) and the PHY layer still doesn't find enough resources from the available RB sets, candidate resources from RB sets suffering from the consistent LBT failure may be reintroduced. The following implementations may be used to set a threshold number for triggering the reintroduction of the candidate resources from RB sets suffering from the consistent LBT failure. One implementation is to add a note in Step 1 as below.

---

...

1) A candidate single-slot resource for transmission $R_{x,y}$ is defined as a set of $L_{subCH}$ contiguous sub-channels ...

...

The total number of candidate single-slot resources is denoted by $M_{total}$. If there are less than ymin*$M_{total}$ candidate single-slot resources, it is up to UE implementation to find additional resources, including the candidate single-slot resources in RB sets indicated by sl-ConsistentLBTFailureRBSet.

...

---

In this example, if there are less than ymin*$M_{total}$ candidate single-slot resources, the candidate single-slot resources in RB sets suffering from the consistent LBT failure may be included in the available candidate single-slot resources. Here, a relative threshold ymin*$M_{total}$ is only an example, but not a limitation. This threshold may also be an absolute threshold such as a threshold denoted by ymin.

Another implementation is to add a note in Step 7 as below in 7b).

---

...

7) If the number of candidate single-slot resources remaining in the set SA is smaller than X · $M_{total}$, then Th(p$_i$,p$_j$) [ and ThLTE (p$_i$,p$_j$), if set, ] is increased by 3 dB for each priority value (p$_i$,p$_j$) and the procedure continues with step 4.

7a) If sidelink DRX active time of RX UE is provided by the higher layer and there is no candidate single-slot resource remained within -continued the sidelink DRX active time in the set S$_A$, the UE based on its
implementation additionally selects and includes at least one candidate
single-slot resources within the sidelink DRX active time in the set S$_A$.
7b) If there are less than zmin*M$_{total}$ candidate single-slot resources
in S$_A$., it is up to UE implementation to find additional resources,
including the candidate single-slot resources in RB sets indicated by
sl-ConsistentLBTFailureRBSet.
The UE shall report set S$_A$ to higher layers.
...

Alternatively, Step 7b may be formulated as: "If there are less than zmin*M$_{total}$ candidate single-slot resources in S$_A$ and resource exclusion threshold has increased above a certain level (or increase more than X times), it is up to UE implementation to find additional resources, including the candidate single-slot resources in RB sets indicated by sl-ConsistentLBTFailureRBSet." Similar to the threshold number as added in Step 1, the threshold number added in Step 7 may be either an absolute or relative threshold (zmin or zmin*M$_{total}$). ymin and zmin may or may not be the same depending on the network deployment and implementations.

The above implementations to reintroduce candidate resources from RB sets with the C-LBT failure be performed separately or in a combination depending on the network deployment and implementations.

In some example embodiments, after the apparatus determines to reinclude the candidate resources from the at least one RB set suffering from the consistent LBT failure, the apparatus may select at least one RB set from the at least one RB set. Then, the apparatus may determine the first candidate resource on the selected RB set as the available candidate resource within the time window.

The selection of the at least one RB set from the at least one RB set suffering from the consistent LBT failure may be performed based on at least one condition (referred to as a second condition) being met. In some example embodiments, the at least one second condition may comprise a condition that a CBR of the selected RB set is equal to or lower than a threshold CBR. For example, the apparatus may select an RB with a lower CBR which is lower than CBRs (which are treated as the threshold CBRs) of other RB sets not suffering from consistent LBT failure or lower than another threshold CBR. The CBR may be measured on RB sets.

Alternatively, or in addition, the at least one second condition may comprise a condition that a quantity of resource reservations on the selected RB set is equal to or lower than a threshold quantity. For example, the apparatus may select an RB with a lower quantity of reservations which may be lower than quantities of reservations (which are treated as threshold quantities) of other RB sets not suffering from consistent LBT failure or lower than another threshold quantity.

Alternatively, or in addition, the at least one second condition may comprise a condition that a LBT process for the selected RB set is successful. For example, if there is no recent CCA failure, for example, if the PHY layer performs a fast CCA procedure, for example, by sensing the channel for one or a few CCA slots, on the channels of the RB sets indicated by the MAC layer as suffering consistent LBT failure and if the PHY layer determines that some of the channels are idle at the instant, the corresponding candidate resources may be reintroduced into the available candidate resources.

By way of example, this condition based on successful LBT may be used under the framework of Step 5, Section 8.1.4, 3GPP TS 38.214. For example, it may be specified in Step 5a that if remaining resources is smaller than X·M$_{total}$, candidate resources from RB sets which are considered to be less suffering of the C-LBT failure are reintroduced, and how to select an RB set is left to UE implementation. Since the PHY layer may conduct measurements that are used by the MAC layer to trigger an RB set to be indicated as suffering from consistent LBT failure, the PHY layer may judge or determine which RB set (or part of an RB set) are less likely to suffer from yet another LBT failure if included in the candidate resource set.

These second conditions for select the RB set from the RB sets suffering from the C-LBT failure may be used separately or in combination. It may rely on the network and terminal implementation to select candidate resources from the RB sets for which measurements indicate one or more favorable conditions are met.

In some example embodiments, before trigger the inclusion of the candidate resources on the at least one RB set suffering from the C-LBT failure, the apparatus may determine whether the candidate resources belonging to the RB set with the C-LBT failure are allowed to be included into available candidate resources within the time window. In an example, the apparatus may be further (pre) configured for whether it is allowed or not to reintroduce candidate resources from an RB set which has been declared as suffering consistent LBT failure.

In some example embodiments, each time a higher layer such as the MAC layer may trigger L1 resource selection for one TB, the higher layer may inform L1 whether it is allowed to reintroduce candidate resources from some RB set(s) declared with consistent LBT failure. In some example embodiments, the higher layer may also inform L1 the condition which needs to be considered for reintroducing the resources from such RB sets. In some example embodiments, L1 may request the higher layer whether it can reintroduce candidate resources from certain RB sets (e.g., from the RB sets for which measurements indicate favorable conditions, as mentioned above), or directly inform to the higher layer that the candidate resource set includes resources from those reintroduced RB sets.

In some other example embodiments, this parameter on whether L1 is allowed to reintroduce candidate resources from some RB set(s) declared with consistent LBT failure, may be configured by the network or be pre-configured. This (pre) configuration may be associated with the resource pool configuration.

It is to be understood that the names of the parameters such as ConsistentLBTFailureRBSets, ymin and zmin and formations or definitions as amended on or added into the 3GPP standards are only illustrative but not limited. Other names or definitions (or formations) are also possible.

Example Apparatus, Device and Medium

In some example embodiments, an apparatus capable of performing the method 200 (for example, the first terminal device 110 in FIG. 1) may comprise means for performing the respective operations of the method 200. The means may be implemented in any suitable form. For example, the means may be implemented in a circuitry or software module. The apparatus may be implemented as or included in the first terminal device 110 in FIG. 1.

In some example embodiments, the apparatus comprises means for determining at least one resource block (RB) set, a consistent listen before talking (LBT) failure being detected for the at least one RB set; and means for determining the number of available candidate resources within a time window, the available candidate resources excluding candidate resources on the at least one RB set within the time window.

In some example embodiments, the apparatus further comprises: means for based on at least one first condition being met, determining, from the candidate resources on the at least one RB set, a first candidate resource as an available candidate resource within the time window.

In some example embodiments, the at least one first condition comprises at least one of: a condition that the number of available candidate resources is equal to or smaller than a threshold number, or a condition that a reference threshold strength for excluding a candidate from the available candidate resources is equal to or higher than a threshold strength.

In some example embodiments, the means for determining the first candidate resource as the available candidate resource within the time window comprises: means for based on at least one second condition being met, selecting at least one RB set from the at least one RB set; and means for determining the first candidate resource on the at least one selected RB set as the available candidate resource within the time window, wherein the at least one second condition comprises at least one of: a condition that a channel busy ratio (CBR) of the at least one selected RB set is equal to or lower than a threshold CBR, a condition that a quantity of resource reservations on the at least one selected RB set is equal to or lower than a threshold quantity, or a condition that a LBT process for the at least one selected RB set is successful.

In some example embodiments, the means for determining the first candidate resource as the available candidate resource within the time window comprises: means for in response to determining that the candidate resources on the at least one RB set are allowed to be included into available candidate resources within the time window, determining, based on the at least one first condition being met, the first candidate resource from the candidate resources on the at least one RB set as the available candidate resource within the time window.

In some example embodiments, the candidate resources on the at least one RB set in a time period within the time window are excluded from the available candidate resources within the time window.

In some example embodiments, the candidate resources on the at least one RB set are determined to be unavailable within the time window.

In some example embodiments, the candidate resources on the at least one RB set are excluded from a set of available candidate resources within the time window.

In some example embodiments, a threshold strength for excluding the candidate resources on the at least one RB set from the available candidate resources is lower than a reference threshold strength.

In some example embodiments, an offset of a threshold strength for excluding a second candidate resource of the candidate resources on the at least one RB set with respect to the reference threshold strength is related to a channel busy ratio (CBR) associated with the second candidate resource.

In some example embodiments, the apparatus further comprises means for performing other operations in some example embodiments of the method 200. In some example embodiments, the means comprises at least one processor; and at least one memory storing instructions that, when executed by the at least one processor, cause the performance of the apparatus.

Figure 3:
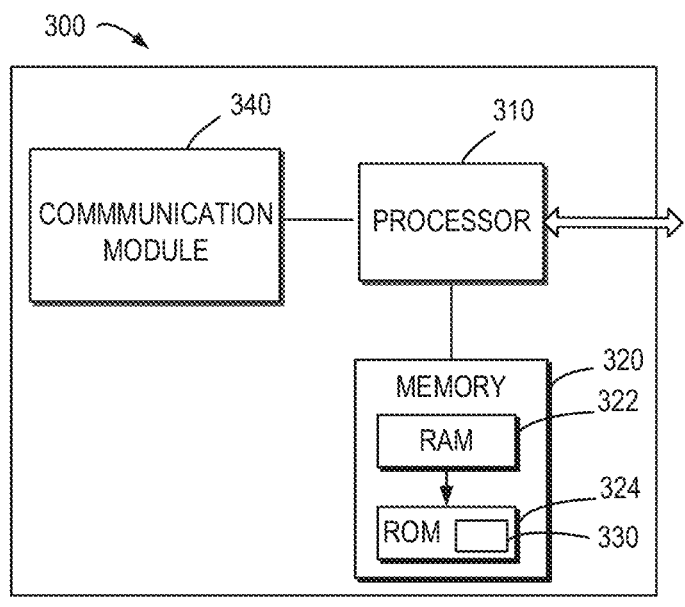
FIG. 3 illustrates a simplified block diagram of a device that is suitable for implementing example embodiments of the present disclosure.

FIG. 3 is a simplified block diagram of a device 300 that is suitable for implementing example embodiments of the present disclosure. The device 300 may be provided to implement a communication device, for example, the first terminal device 110, the second terminal device 120 or the network device 130 as shown in FIG. 1. As shown, the device 300 includes one or more processors 310, one or more memories 320 coupled to the processor 310, and one or more communication modules 340 coupled to the processor 310.

The communication module 340 is for bidirectional communications. The communication module 340 has one or more communication interfaces to facilitate communication with one or more other modules or devices. The communication interfaces may represent any interface that is necessary for communication with other network elements. In some example embodiments, the communication module 340 may include at least one antenna.

The processor 310 may be of any type suitable to the local technical network and may include one or more of the following: general purpose computers, special purpose computers, microprocessors, digital signal processors (DSPs) and processors based on multicore processor architecture, as non-limiting examples. The device 300 may have multiple processors, such as an application specific integrated circuit chip that is slaved in time to a clock which synchronizes the main processor.

The memory 320 may include one or more non-volatile memories and one or more volatile memories. Examples of the non-volatile memories include, but are not limited to, a Read Only Memory (ROM) 324, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 322 and other volatile memories that will not last in the power-down duration.

A computer program 330 includes computer executable instructions that are executed by the associated processor 310. The instructions of the program 330 may include instructions for performing operations/acts of some example embodiments of the present disclosure. The program 330 may be stored in the memory, e.g., the ROM 324. The processor 310 may perform any suitable actions and processing by loading the program 330 into the RAM 322.

The example embodiments of the present disclosure may be implemented by means of the program 330 so that the device 300 may perform any process of the disclosure as discussed with reference to FIG. 1 to FIG. 5. The example embodiments of the present disclosure may also be implemented by hardware or by a combination of software and hardware.

In some example embodiments, the program 330 may be tangibly contained in a computer readable medium which may be included in the device 300 (such as in the memory 320) or other storage devices that are accessible by the device 300. The device 300 may load the program 330 from the computer readable medium to the RAM 322 for execution. In some example embodiments, the computer readable medium may include any types of non-transitory storage medium, such as ROM, EPROM, a flash memory, a hard disk, CD, DVD, and the like. The term "non-transitory," as used herein, is a limitation of the medium itself (i.e., tangible, not a signal) as opposed to a limitation on data storage persistency (e.g., RAM vs. ROM).

Figure 4:
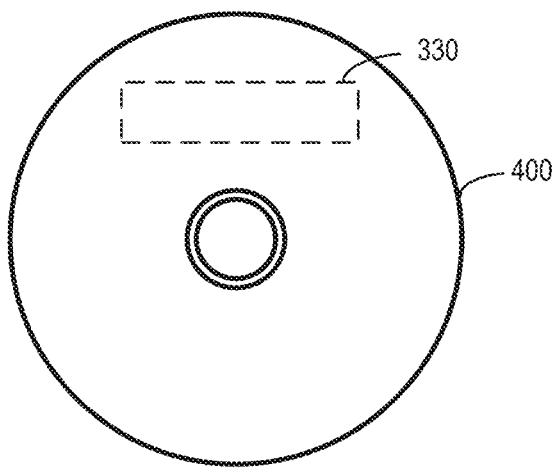
FIG. 4 illustrates a block diagram of an example computer readable medium in accordance with some example embodiments of the present disclosure.

FIG. 4 shows an example of the computer readable medium 400 which may be in form of CD, DVD or other optical storage disk. The computer readable medium 400 has the program 330 stored thereon.

Generally, various embodiments of the present disclosure may be implemented in hardware or special purpose circuits, software, logic or any combination thereof. Some aspects may be implemented in hardware, and other aspects may be implemented in firmware or software which may be executed by a controller, microprocessor or other computing device. Although various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

Some example embodiments of the present disclosure also provide at least one computer program product tangibly stored on a computer readable medium, such as a non-transitory computer readable medium. The computer program product includes computer-executable instructions, such as those included in program modules, being executed in a device on a target physical or virtual processor, to carry out any of the methods as described above. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. The program code may be provided to a processor or controller of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, although several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. An apparatus comprising:
   at least one processor; and
   at least one memory storing instructions that, when executed by the at least one processor, cause the apparatus at least to:
   detect, at a lower layer of the apparatus, a listen before talking (LBT) failure for at least one resource block (RB) set within a time window;
   report, by the lower layer to a medium access control (MAC) entity of the apparatus, the LBT failure, wherein the MAC entity is an entity of a higher layer compared with the lower layer;
   determine, by the MAC entity, that a consistent LBT failure for an RB set of the at least one RB set is detected within the time window;
   transmit, by the MAC entity to the lower layer, a parameter indicating the RB set where the consistent LBT failure has been detected; and
   determine, by the lower layer of the apparatus, a number of available candidate resources by excluding candidate resources associated with the RB set indicated by the parameter.

2. The apparatus of claim 1, wherein the at least one memory and the at least one processor further cause the apparatus to:
   based on at least one first condition being met, determine, from the available candidate resources, a first candidate resource as an available candidate resource within the time window.

3. The apparatus of claim 2, wherein the at least one first condition comprises at least one of:
   a condition that the number of available candidate resources is equal to or smaller than a threshold number, or
   a condition that a reference threshold strength for excluding a candidate from the available candidate resources is equal to or higher than a threshold strength.

4. The apparatus of claim 2, wherein the at least one memory and the at least one processor cause the apparatus to:

based on at least one second condition being met, select at least one RB set from the at least one RB set; and determine the first candidate resource on the at least one selected RB set as the available candidate resource within the time window, wherein the at least one second condition comprises at least one of:

a condition that a channel busy ratio (CBR) of the at least one selected RB set is equal to or lower than a threshold CBR, a condition that a quantity of resource reservations on the at least one selected RB set is equal to or lower than a threshold quantity, or a condition that a LBT process for the at least one selected RB set is successful.

5. The apparatus of claim 2, wherein the at least one memory and the at least one processor cause the apparatus to:

in response to determining that the available candidate resources are allowed to be included into available candidate resources within the time window, determine, based on the at least one first condition being met, the first candidate resource from the available candidate resources as the available candidate resource within the time window.

6. A method comprising:

detecting, at a lower layer of an apparatus, a listen before talking (LBT) failure for at least one resource block (RB) set within a time window;

reporting, by the lower layer to a medium access control (MAC) entity of the apparatus, the LBT failure, wherein the MAC entity is an entity of a higher layer compared with the lower layer;

determining, by the MAC entity, that a consistent LBT failure for an RB set of the at least one RB set is detected within the time window;

transmitting, by the MAC entity to the lower layer, a parameter indicating the RB set where the consistent LBT failure has been detected; and determining, by the lower layer of the apparatus, a number of available candidate resources by excluding candidate resources associated with the RB set indicated by the parameter.

7. The method of claim 6, further comprising:

based on at least one first condition being met, determining, from the available candidate resources, a first candidate resource as an available candidate resource within the time window.

8. The method of claim 7, wherein the at least one first condition comprises at least one of:

a condition that the number of available candidate resources is equal to or smaller than a threshold number, or a condition that a reference threshold strength for excluding a candidate from the available candidate resources is equal to or higher than a threshold strength.

9. The method of claim 7, wherein the determining the first candidate resource as the available candidate resource within the time window comprises:

based on at least one second condition being met, selecting at least one RB set from the at least one RB set; and determining the first candidate resource on the at least one selected RB set as the available candidate resource within the time window, wherein the at least one second condition comprises at least one of:

a condition that a channel busy ratio (CBR) of the at least one selected RB set is equal to or lower than a threshold CBR, a condition that a quantity of resource reservations on the at least one selected RB set is equal to or lower than a threshold quantity, or a condition that a LBT process for the at least one selected RB set is successful.

10. The method of claim 7, wherein determining the first candidate resource as the available candidate resource within the time window comprises:

in response to determining that the available candidate resources are allowed to be included into available candidate resources within the time window, determining, based on the at least one first condition being met, the first candidate resource from the available candidate resources as the available candidate resource within the time window.

11. A non-transitory computer readable medium comprising instructions stored thereon for causing an apparatus at least to perform:

detecting, at a lower layer of the apparatus, a listen before talking (LBT) failure for at least one resource block (RB) set within a time window;

reporting, by the lower layer to a medium access control (MAC) entity of the apparatus, the LBT failure, wherein the MAC entity is an entity of a higher layer compared with the lower layer;

determining, by the MAC entity, that a consistent LBT failure for an RB set of the at least one RB set is detected within the time window;

transmitting, by the MAC entity to the lower layer, a parameter indicating the RB set where the consistent LBT failure has been detected; and determining, by the lower layer of the apparatus, a number of available candidate resources by excluding candidate resources associated with the RB set indicated by the parameter.

12. The non-transitory computer readable medium of claim 11, further comprising instructions for causing the apparatus at least to perform:

based on at least one first condition being met, determining, from the available candidate resources, a first candidate resource as an available candidate resource within the time window.

13. The non-transitory computer readable medium of claim 12, wherein the at least one first condition comprises at least one of:

a condition that the number of available candidate resources is equal to or smaller than a threshold number, or a condition that a reference threshold strength for excluding a candidate from the available candidate resources is equal to or higher than a threshold strength.

14. The non-transitory computer readable medium of claim 13, wherein the determining the first candidate resource as the available candidate resource within the time window comprises:

based on at least one second condition being met, selecting at least one RB set from the at least one RB set; and determining the first candidate resource on the at least one selected RB set as the available candidate resource within the time window, wherein the at least one second condition comprises at least one of:

a condition that a channel busy ratio (CBR) of the at least one selected RB set is equal to or lower than a threshold CBR, a condition that a quantity of resource reservations on the at least one selected RB set is equal to or lower than a threshold quantity, or a condition that a LBT process for the at least one selected RB set is successful.

15. The non-transitory computer readable medium of claim 12, wherein the determining the first candidate resource as the available candidate resource within the time window comprises:

in response to determining that the available candidate resources are allowed to be included into available candidate resources within the time window, determining, based on the at least one first condition being met, the first candidate resource from the available candidate resources as the available candidate resource within the time window.

* * * * *